United States Patent [19]

Suda et al.

[11] Patent Number: 4,980,773
[45] Date of Patent: Dec. 25, 1990

[54] IN FOCUS DETECTING APPARATUS HAVING A PLURALITY OF BANDPASS FILTERS

[75] Inventors: Hirofumi Suda; Masamichi Toyama; Akihiro Fujiwara, all of Yokohama; Kunihiko Yamada, Tanashi, all of Japan

[73] Assignee: Canon Kabushiki Kaisha, Tokyo, Japan

[21] Appl. No.: 401,512

[22] Filed: Aug. 31, 1989

Related U.S. Application Data

[63] Continuation of Ser. No. 125,989, Nov. 27, 1987, abandoned.

[30] Foreign Application Priority Data

Dec. 3, 1986 [JP] Japan ................... 61-288071

[51] Int. Cl.$^5$ ............................ H04N 5/232
[52] U.S. Cl. ....................... 358/227; 358/225
[58] Field of Search ..................... 358/225, 227

[56] References Cited

U.S. PATENT DOCUMENTS

| | | | |
|---|---|---|---|
| 4,414,575 | 11/1983 | Yamamoto et al. | 358/227 |
| 4,853,788 | 8/1989 | Murashima et al. | 358/227 |
| 4,871,906 | 10/1989 | Ueda et al. | 358/227 |

FOREIGN PATENT DOCUMENTS 6165671 9/1984 Japan .
6170867 9/1984 Japan .

Primary Examiner—James J. Groody
Assistant Examiner—Kim Y. Vu
Attorney, Agent, or Firm—Fitzpatrick, Cella, Harper & Scinto

[57] ABSTRACT

An in-focus detecting apparatus has a plurality of band pass filters of different frequency pass bands. A video signal from an image pickup device is supplied to these band pass filters and a degree of in-focus of a photographing optical system is detected by an output of each of the band pass filters. This apparatus has a filter switching circuit to sequentially select the outputs of the band pass filters at a field period. Every time each of the band pass filters is selected, the peak value of the output of the selected band pass filter is compared with the preceding peak value which was previously selected to thereby obtain the differential value. The focus adjustment is performed on the basis of the output signal of the band pass filter having the maximum differential value.

37 Claims, 6 Drawing Sheets

IN FOCUS DETECTING APPARATUS HAVING A PLURALITY OF BANDPASS FILTERS

This application is a continuation of application Ser. No. 125,989 filed Nov. 27, 1987, now abandoned.

BACKGROUND OF THE INVENTION

1. Field of the Invention

The present invention relates to an in-focus detecting apparatus suitable for use in an apparatus to detect the in-focus condition by use of a video signal obtained from image pickup means.

2. Description of the Related Background Art

Hitherto, there has been proposed an automatic focusing system by what is called a mountain climbing servo system (Japanese Laid-Open Patent Gazette No. 188966/1983 in which a video signal which was output from an image pickup device or the like is supplied to a plurality of band pass filters (BPF) having different pass bands. The fineness of the photographing screen is detected from the video signal by the output of each BPF, and the position of the focusing lens is adjusted so as to obtain the maximum fineness.

A block diagram of the conventional automatic focus matching apparatus is shown in FIG. 1. In this apparatus, the optical information of an object to be photographed which is received through a lens 1 is converted into an electric signal by a camera tube 2 and amplified by a preamplifier 3 and thereafter, it is converted into a television signal by a process circuit 4. A BPF 13 has a low center frequency and its band lies within a range from 200 kHz to 1 MHz, so that although the detecting range is wide, the detecting sensitivity is low. On the other hand, in the case of a BPF 14, the center frequency is high and the band lies within a range from 15 MHz to 25 MHz. Therefore, although the detecting range is narrow, the detecting sensitivity is higher than that of the BPF 13 and is excellent. An operation processing circuit 15 has a function of what is called a change-over switch for allowing an output of the BPF 13 to pass when the focus adjusting position of the lens 1 is largely deviated from the focal point and for allowing an output of the BPF 14 to pass at a position near the focal point. The decision of this switching is performed on the basis of whether the output of the BPF 14 is at a predetermined threshold value or more or not. In the focus matching apparatus, the lens 1 is finely vibrated in the direction of an optical axis at a reference frequency. A reference frequency component detecting circuit 8 fetches the relevant reference frequency component from an output of the operation processing circuit 15 and the synchronous detection is performed by a synchronous detection circuit 9. An output of the synchronous detection circuit 9 is supplied to a motor drive circuit 11, thereby controlling the lens 1 so as to move the lens 1 to the focal point.

FIG. 2 shows an example of the output of the BPF which is obtained by such a system. Since the BPF output voltage (hereinafter, referred to as a focal voltage) corresponds to the fineness of the photographed video image, the focal voltage becomes maximum in the situation where the image forming surface of the photographing lens coincides with the image pickup surface of the camera tube, namely, in the infocus state. As the image forming surface of the photographing lens is deviated from the image pickup surface of the camera tube, the focal voltage gradually decreases. Therefore, by adjusting the position of the photographing lens so as to obtain the maximum focal voltage, the focal point can be automatically adjusted. Since the curve of the focal voltage generally largely changes in accordance with an object to be photographed or focus matching state, the BPF having a large output level must be selected each stage of the focus adjustment. In general, the output of the $BPF_1$ for the middle frequency band is used in the largely faded state with the low fineness, and the output of the $BPF_2$ for super high frequency band is used at a position near the focal point in order to raise the stop accuracy of the lens.

However, with the foregoing constitution, since two BPF outputs cannot be simultaneously processed by the operation processing circuit 15, the decision in selection of the BPF must be made on the basis of a proper threshold value. As is well known, since the output level of the BPF largely differs in dependence on an object to be photographed, it is very difficult to set such a threshold value to select the BPF, causing a focus malfunction.

On the other hand, the focal voltage itself largely depends on the brightness of an object to be photographed. In particular, under the illumination by a fluorescent lamp, the focal voltage of each field causes a level fluctuation at a certain period. For example, in the case where the field frequency is 60 Hz and the power source frequency is 50 Hz, since the fluorescent lamp is lit on and off at 100 Hz, the timings of both frequencies coincide at the period of 60 Hz which is three times as high as 20 Hz and at the period of 100 Hz which is five times as high as 20 Hz. Thus, the level fluctuation at the period of 20 Hz occurs in the focal voltage. This directly results in failure of the automatic focusing operation.

SUMMARY OF THE INVENTION

It is, therefore, an object of the present invention to provide an in-focus detecting apparatus in which when a plurality of BPF are selected and used, the selection can be properly performed and also a bad influence of the fluorescent lamp can be prevented.

To accomplish this object, according to the invention, there is provided an apparatus having a plurality of band pass filters (BPF) having different frequency pass characteristics, in which a video signal from image pickup means is supplied to these BPF, and a degree of in-focus of a photographing optical system is detected by an output of each BPF. In this apparatus, by providing selecting means for sequentially selecting the output of each BPF at a predetermined frequency, a constitution to circulatively obtain each BPF output can be simplified. In the output of each BPF, for example, the value which is obtained at present and the value which was obtained in the past are compared. On the basis of the result of the comparison, the BPF output for use in detection of the in-focus condition can be selected. On the other hand, by matching the selecting period of the selecting means with the period of the interference fluctuation due to the fluorescent lamp which is lit on and off by, e.g., a commercially available AC power source, this interference fluctuation merely results in the whole increase or decrease in the BPF output level. Therefore, the detecting accuracy does not deteriorate due to the interference fluctuation and the focus malfunction does not occur.

Each BPF ia periodically selected and with respect to each BPF, the value which is obtained at present and the preceding value which was obtained in the past are compared. Thus, the values of the respective BPF are substantially simultaneously used and the in-focus condition can be detected.

DETAILED DESCRIPTION OF THE PREFERRED EMBODIMENTS

Figure 1:
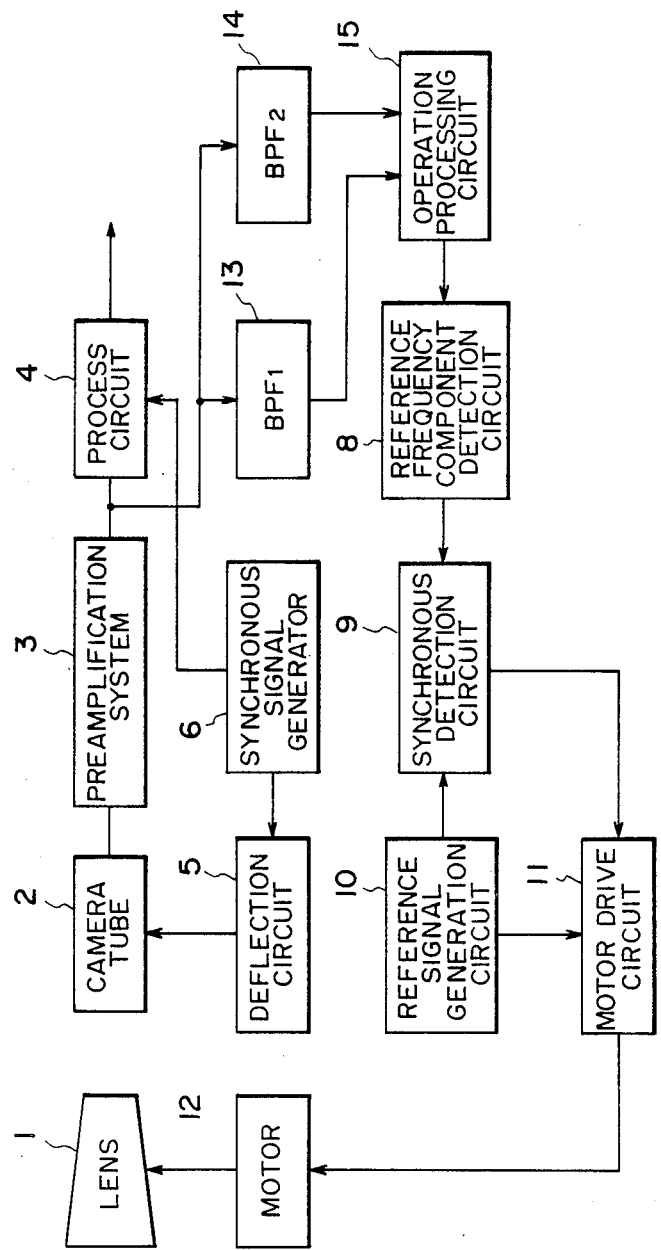
FIG. 1 is a block diagram showing a constitution of a conventional automatic focusing apparatus.
Figure 2:
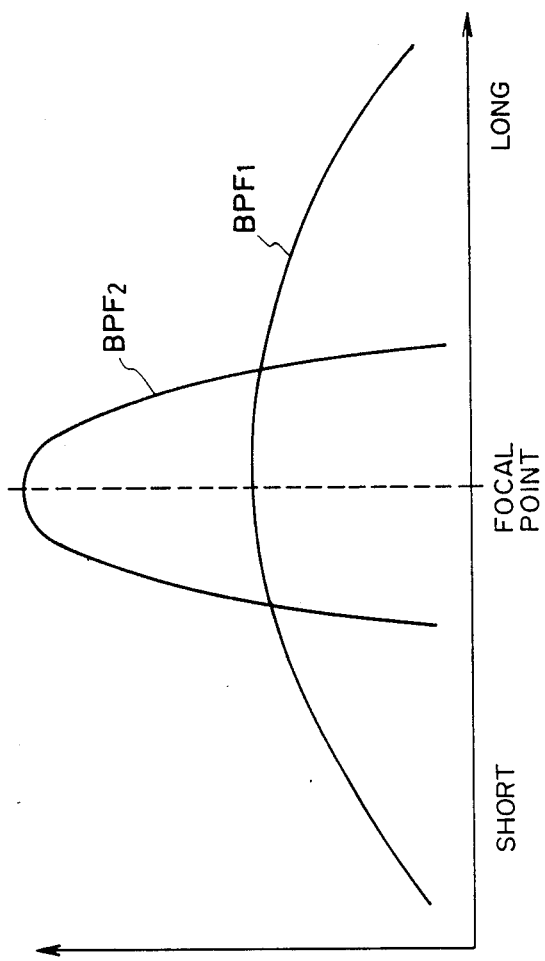
FIG. 2 is a characteristic diagram of a focal voltage in the conventional apparatus.
Figure 3:
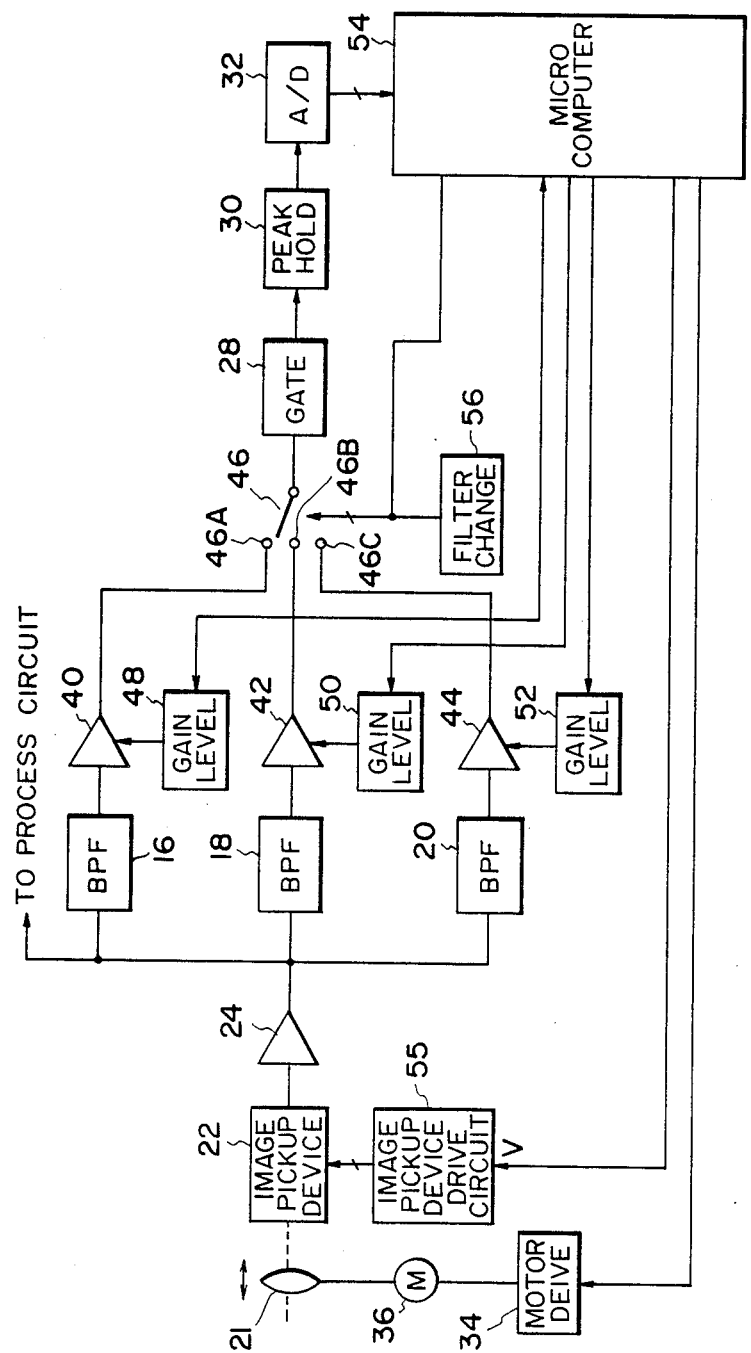
FIG. 3 is a block diagram showing a constitution of the first embodiment of the present invention.
Figure 4:
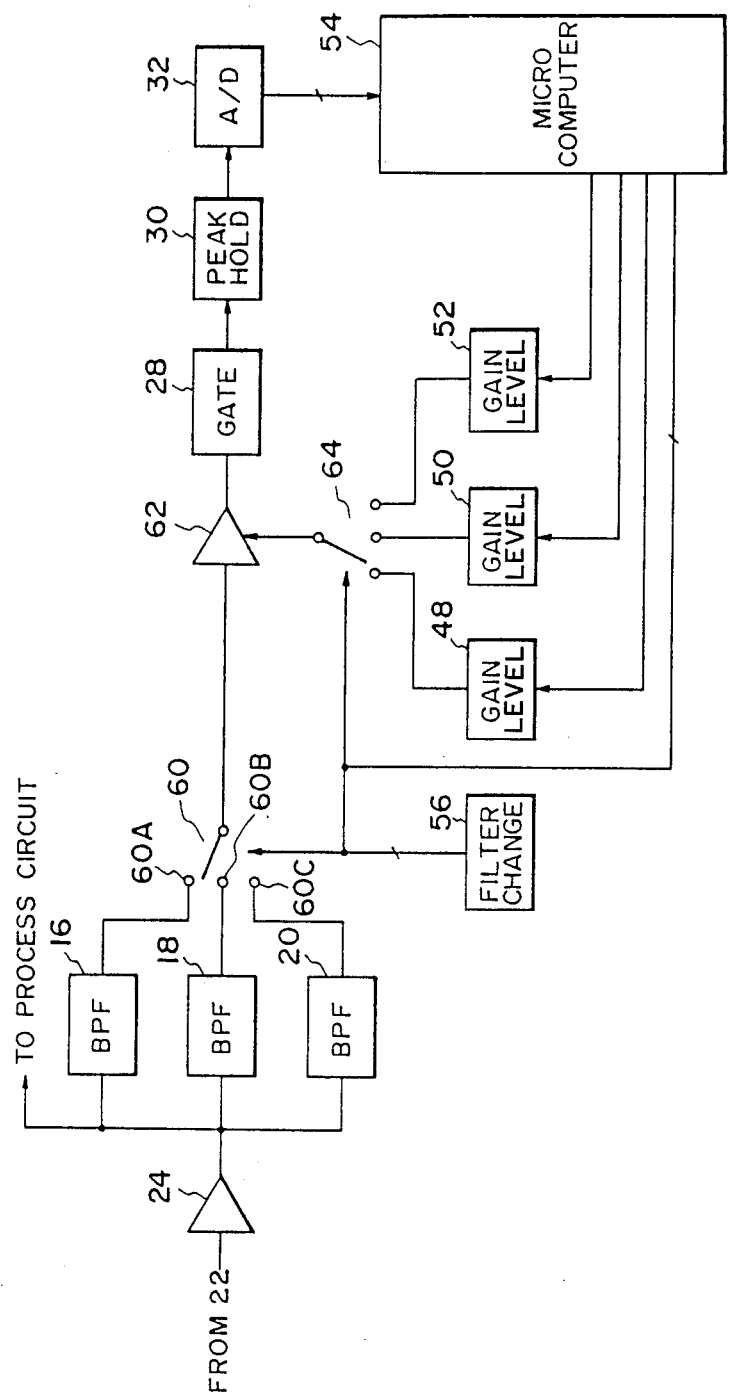
FIG. 4 is a partial block diagram of the second embodiment of the invention.

An embodiment of the present invention will be described hereinbelow with reference to the drawings. FIG. 3 shows a block diagram of the first embodiment of the invention. FIG. 4 shows the second embodiment of the invention.

In FIG. 3, the light from an object to be photographed which was transmitted through a lens 21 is converted into an electric video signal by an image pickup device 22. The video signal is amplified by a preamplifier 24 and thereafter, it is sent to a processing circuit of a video camera and is also supplied to BPF 16, 18, and 20 to detect the in-focus condition. The BPF 16 is used for the middle frequency band, the BPF 18 is used for the high frequency band, and the BPF is used for the super high frequency band. An output of the BPF 16 is connected to a selection contact 46A of an analog switch 46 through a variable gain amplifier 40. An output of the BPF 18 is connected to a selection contact 46B through a variable gain amplifier 42. An output of the BPF 20 is connected to a selection contact 46C through a variable gain amplifier 44. The gains of the variable gain amplifiers 40, 42, and 44 are determined by the values held in gain level registers 48, 50, and 52 which are interconnected with the relevant amplifiers 40, 42, and 44.

A selection output of the switch 46 is supplied to a gate circuit 28. The gate circuit 28 allows only the signal in the screen region which is used for the in-focus detection to pass. A peak hold circuit 30 holds the peak of an output of the gate circuit 28 every screen. An A/D converter 32 converts the analog value held in the peak hold circuit 30 into a digital value and supplies it to a microcomputer 54.

The microcomputer 54 compares the signal value from the A/D converter 32 with the immediately-preceding value to thereby decide the moving direction of the lens 21, and sends a drive signal to a motor drive circuit 34. The motor drive circuit 34 controls a drive motor 36 of the lens 21 on the basis of the drive signal. When the level of the signal from the A/D converter 32 is improper (e.g., the signal level is not higher than or not lower than a predetermined threshold level), the microcomputer 54 changes the contents of the gain level registers 48, 50, and 52 so as to set the signal level to the proper value, thereby adjusting the gains of the amplifiers 40, 42, and 44. Further, the microcomputer 54 sends a vertical sync signal as a reference signal to an image pickup device drive circuit 55 to drive the image pickup device 22

Figure 6:
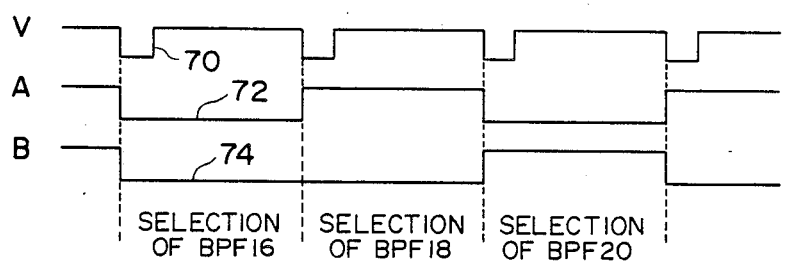
FIG. 6 is a timing chart of switching signals which are generated from a filter change signal generator 56 in FIGS. 3 and 4.

The switch 46 periodically selects one of the BPF 16, 18, and 20 in accordance with the change signal from a filter change signal generator 56. The generator 56 is a combination logic circuit to form two-bit signals 72 and 74 shown in a timing chart of FIG. 6 from a vertical sync signal 70 in a camera section. The BPF to be selected is decided by a combination of the two-bit signals. The two-bit signals are also supplied to the microcomputer 54, thereby informing which BPF was selected by the switch 46. The switch 46 is sequentially switched at the period of the vertical sync signal.

Figure 5:
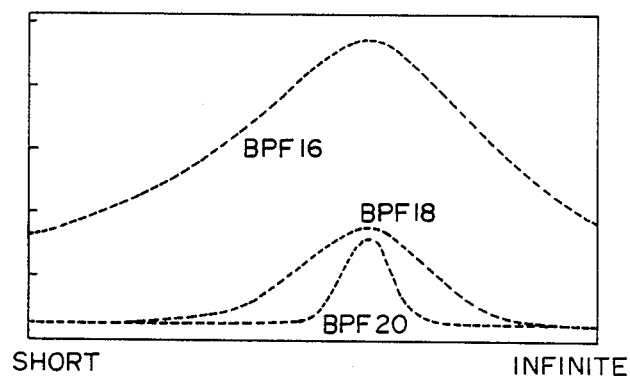
FIG. 5 is a characteristic diagram of the focal voltage which is obtained by the first embodiment of the invention.

FIG. 5 shows the holding value (focal voltage) at the field period of the peak hold circuit 30. In this invention, one BPF is not continuously (namely, for the continuous fields) selected as in the conventional apparatus but a plurality of BPF (three BPF in the example shown in the diagrams) having different frequency characteristics are sequentially selected. Therefore, the focal voltage characteristic is indicated by a point.

In the example shown in the diagrams, since three BPF are sequentially selected, when the field frequency assumes 60 Hz, each BPF is selected at the period of 20 Hz. Specifically, the three BPF are switched at the period of the least common multiple of the field period and a light-on/off period of the ambient illumination. Therefore, even if the level fluctuation of the period of 20 Hz occurred in the output of the preamplifier 24 in the area where the commercially available AC power source frequency is 50 Hz, this level fluctuation merely causes the whole level of the characteristic of each filter in FIG. 5 to increase. The relative level fluctuation between the respective filters does not occur. Thus, the level fluctuation can be solved by adjusting the gains of the amplifiers 40, 42, and 44 and the output of the peak hold circuit 30 is not influenced.

Figure 7:
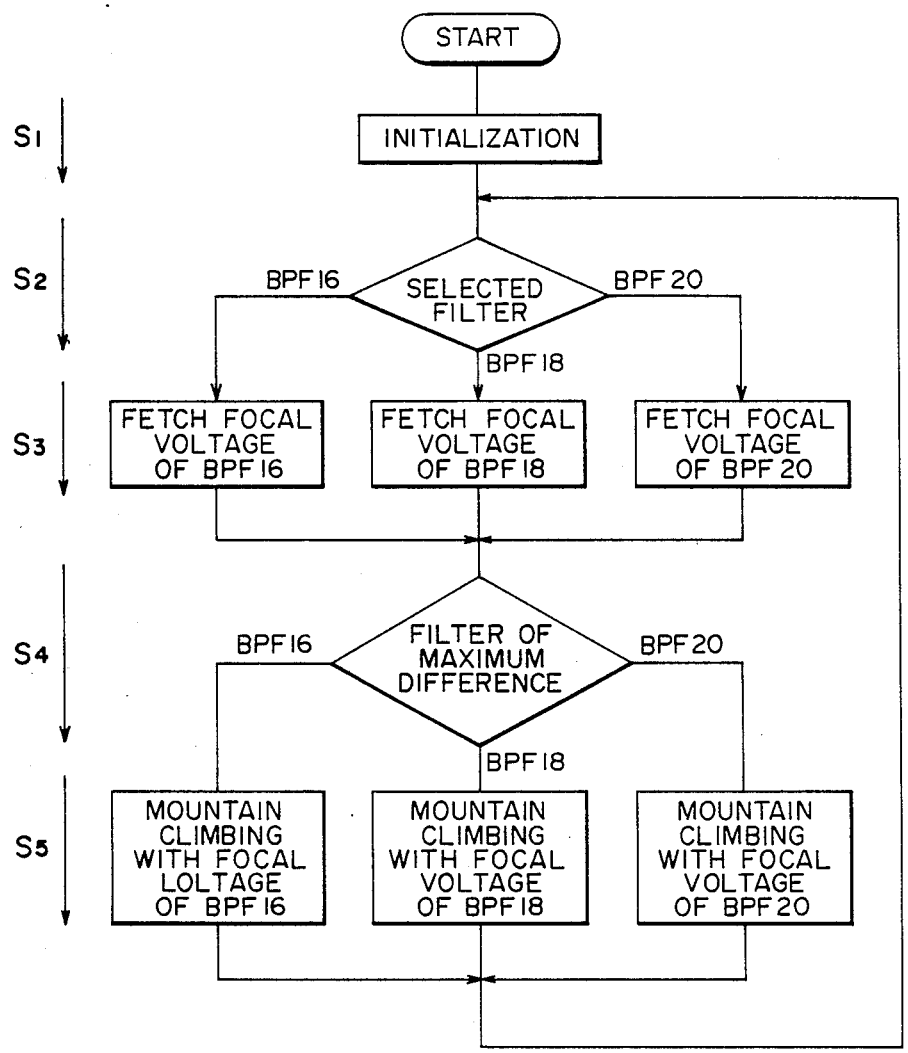
FIG. 7 is a flowchart showing the operation of a microcomputer 54.

The operation of the microcomputer 54 will now be simply explained. FIG. 7 shows a flowchart for the operation. At the start of the operation, each parameter is first initialized (step S1). Next, the present selected filter is known from the output of the filter change signal generator 56 (step S2). The focal voltage obtained by A/D converting the peak value of the output signal of the selected filter is fetched and substituted for the corresponding variable in the focal voltage fetching routine (step S3). With respect to the same BPF, the difference between the present focal voltage and the preceding focal voltage which has previously been fetched is calculated. Namely, at any time point, in time the differential values regarding all of the BPF 16, 18, and 20 are obtained. By comparing those differential values with each other, a check is made to see if the differential value regarding which BPF is maximum (step S4). The focal voltage of the BPF having the maximum differential value is selected and the mountain climbing control is executed (step S5). Thereafter, the processing routine is returned to step S2 and the processes in steps S2 to S5 are repeated. In the case of adjusting the position of the lens 10 by the general focal voltage value which is obtained by mutually arithmetically operating with respect to each frequency component, it is sufficient to perform the arithmetic operations and control in steps S4 and S5.

In this embodiment, when the BPF is selected, since the filter having the largest difference between the preceding output and the present output is used, the BPF can be more properly selected and the accuracy is improved as compared with the conventional method whereby the output of each BPF is compared with the threshold value.

On the other hand, in the embodiment, since each BPF output is switched by the switch 46, when each BPF output is taken into the microcomputer 54, it is sufficient to use one system consisting of the gate circuit 28, peak hold circuit 30, and A/D converter 32 and the constitution is simplified. Further, there is no need to match the characteristics of the respective systems.

FIG. 4 shows a block diagram of the second embodiment of the invention. In FIG. 4, the same parts and components as those shown in FIG. 3 are partially omitted. In this example, the outputs of the BPF 16, 18, and 20 are serially connected to selection contacts 60A, 60B, and 60C of a selecting switch 60. A variable gain amplifier 62 is connected between an output of the switch 60 and the gate circuit 28. The outputs of the gain level registers 48, 50, and 52 are connected to a gain control input of the variable gain amplifier 62 through a selecting switch 64. The switch 64 is sequentially switched by the same change signal from the filter change signal generator 56 to instruct the switching of the switch 60. The outputs of the gain level registers 48, 50, and 52 are sequentially supplied to the gain control input of the amplifier 62, thereby controlling the gain of the amplifier 62. With this constitution, by use of only a single variable gain amplifier 62, the signal obtained by amplifying each BPF output by the corresponding amplification gain is input to the gate circuit 28, i.e., the peak hold circuit 30 in a manner similar to the circuit of FIG. 3. Thus, the constitution is further simplified.

Although the case where the field frequency is 60 Hz has been described above in areas where the field frequency is 50 Hz and the commercially available AC power source frequency is 60 Hz, a level fluctuation of 10 Hz occurs in the focal voltage. Therefore, in this case, by using five BPF and fetching each BPF output once per five fields, the influence by the fluorescent lamp can be eliminated.

As described above, according to the invention, by obtaining the signal relative to the degree of in-focus from each of a plurality of BPF having different frequency pass characteristics, the output from the optimum BPF suitable for the detection of the in-focus can be used irrespective of an object to be photographed, the in-focus condition, or the like. Also, these BPF are selected at a predetermined period and the outputs of the respective BPF are time sequentially obtained. Therefore, in spite of the fact that the values of the respective BPF can be substantially simultaneously obtained, the influence of the noise by the fluorescent lamp or the like can be eliminated and the in-focus condition can be always correctly detected.

What is claimed is:

1. An in-focus detecting apparatus comprising:
    image pickup means for converting an image of an object into a video signal;
    a plurality of filtering means having different frequency pass characteristics, each for extracting a frequency component corresponding to its pass band from the video signal output from said image pickup means;
    selecting means for sequentially selecting at a predetermined period the outputs of said plurality of filtering means, and for outputting the sequentially selected outputs; and
    in-focus detecting means for selecting a desired one of the sequentially selected outputs, and for detecting a degree of in-focus based on the selected desired output.

2. An apparatus according to claim 1, wherein said plurality of filtering means are band pass filters having different frequency pass bands, respectively.

3. An apparatus according to claim 1, wherein said in-focus degree detecting means detects the in-focus on the basis of a peak value of the output signal of the filtering means selected by said selecting means.

4. An apparatus according to claim 3, wherein each time the outputs of said plurality of filtering means are respectively selected, said in-focus detecting means detects the in-focus degree on the basis of a differential value obtained by comparing the peak value of the selected desired output of the selected filtering means output and the peak value of this filtering means selected previously.

5. An apparatus according to claim 4, wherein said in-focus detecting means calculates said differential value for every filter means and detects the in-focus degree on the basis of the output signal of the filtering means having the maximum differential value.

6. An apparatus according to claim 5, further comprising variable gain means for varying a level of the output signal of each of said filtering means.

7. An apparatus according to claim 6, wherein said variable gain means controls the level of the output signal of each of the filtering means in accordance with the output of each of said filtering means.

8. An apparatus according to claim 7, wherein said variable gain means comprises:
    a plurality of variable gain amplifiers each of which is arranged on an output side of each of said filtering means; and
    a plurality of gain level registers each for setting the gain of a corresponding one of said plurality of variable gain amplifiers.

9. An apparatus according to claim 7, wherein said variable gain means comprises: a single variable gain amplifier which is connected to the outputs of said filtering means at the period of said selecting means; and a gain level register provided for each of said filtering means which is connected to said variable gain amplifier at the period of the said selecting means.

10. An apparatus according to claim 1, further comprising focal point adjusting means for driving a photographing optical system to a focal point on the basis of an output of said in-focus detecting means.

11. An in-focus detecting apparatus comprising:
    image pick-up means for converting an image of an object which has formed on an image pickup surface into a video signal;
    output means for dividing the video signal from a detecting region of said image pickup surface output from said image pickup means into a plurality of signals having different frequency bands and for outputting these signals;
    selecting means for sequentially selecting the signals of the respective frequency bands of said output means at a predetermined period, and for outputting the selected signals; and in-focus detecting means for detecting a degree of in-focus from one of the outputs sequentially selected and output by said selecting means.

12. An apparatus according to claim 11, wherein said output means comprises a plurality of band pass filters each having a different pass band, said selecting means sequentially selectively switching outputs of said plurality of band pass filters at a predetermined period.

13. An apparatus according to claim 12, wherein said selecting means switches said band pass filters at the period of the least common multiple of a field period and a light-on/off period of the ambient illumination.

14. An apparatus according to claim 12, further comprising variable gain means for varying a level of each of the signals output by said plurality of band pass filters.

15. An apparatus according to claim 14, wherein said variable gain means comprises:
a plurality of variable gain amplifiers each of which is arranged on an output side of a corresponding one of said plurality of band pass filters; and
a plurality of gain level registers each for setting the gain of a corresponding one of said plurality of variable gain amplifiers.

16. An apparatus according to claim 14, wherein said variable gain means comprises:
a single variable gain amplifier selectively connected to the outputs of said plurality of band pass filters at the period of said selecting means; and
a plurality of gain level registers each of which is provided for a corresponding one of said plurality of band pass filters which are connected to said variable gain amplifier at the period of the selecting means.

17. An apparatus according to claim 11, wherein said in-focus detecting means comprises:
peak detecting means for detecting a peak value of each of the signals of the respective frequency bands selected by said selecting means; and
comparing means for comparing the peak value of the signal of the present selected frequency band and the peak value of that frequency band selected before a predetermined period, and for outputting a differential value of the peak values,
and wherein the in-focus detecting means detects the degree of in-focus on the basis of the signal of the frequency band having the maximum differential value derived with respect to each of the signals of the frequency bands by said comparing means.

18. An apparatus according to claim 17, further comprising focal point adjusting means for driving a photographing optical system to a focal point in accordance with an output of the in-focus detecting means.

19. An automatic focusing apparatus comprising:
image pickup means for converting an image of an object formed on an image pickup surface with a photographing optical system into a video signal;
filtering means for dividing the video signal output from said image pickup means into a plurality of filtered signals of different frequency bands and for outputting the filtered signals;
selecting means for sequentially selecting the signals of the respective frequency bands of said filtering means at a predetermined period;
comparing means for obtaining a peak value of the signal of the selected frequency band each time the frequency band is selected by said selecting means, and for comparing this peak value with the peak value when said frequency band was selected at a preceding time; and
focal point adjusting means for controlling a relative relation between positions of a photographing optical system and said image pickup surface on the basis of the filtered signal of the frequency band having the maximum difference value of the peak values which were obtained by said comparing means.

20. An apparatus according to claim 19, wherein said filtering means divides the video signal from a predetermined detecting region set on said image pickup surface into the filtered signals of a plurality of frequency bands and outputs these filtered signals.

21. An apparatus according to claim 19, wherein said selecting means selects the signals of the respective frequency bands of said filtering means at a field period.

22. An apparatus according to claim 21, wherein said filtering means comprises of a plurality of band pass filters in which said respective frequency bands are used as pass bands.

23. An apparatus according to claim 22, further comprising level varying means for varying an output level of each of said plurality of band pass filters.

24. A measuring apparatus comprising:
sensor means for forming a predetermined electrical signal from incident light and outputting the formed electrical signal;
extracting means for extracting a plurality of signal components which are different from each other, from the electrical signal output from said sensor means and outputting the plurality of signal components which are extracted;
selecting means for selectively outputting said plurality of signal components output from said extracting means at a predetermined period; and
control means for controlling an image pickup state according to an output of said selecting means.

25. An apparatus according to claim 24, wherein said sensor means includes image pickup means for photoelectrically converting an image of an object which is focused by a photographing optical system into an image signal and for outputting said image signal.

26. An apparatus according to claim 25, wherein said extracting means includes a plurality of filters which have different pass bands, respectively.

27. An apparatus according to claim 26, wherein said selecting means switches said plurality of signal components at a period synchronized with a vertical synchronous signal.

28. An apparatus according to claim 27, wherein said control means respectively compares said plurality of signal components currently output from said selecting means with the plurality of signal components output from said selecting means in a preceding period and controls the image pickup state by using an output of a signal component which has a maximum change of level among said plurality of signal components.

29. An apparatus according to claim 28, further comprising gain control means for controlling signal levels of said plurality of signal components output from said extracting means to adjust the signal levels to predetermined levels.

30. An apparatus according to claim 27, wherein said control means adjusts a focus of said image pickup means on the basis of outputs of said plurality of filters.

31. An image pickup apparatus comprising:

image pickup means for photoelectrically converting light incident through a photographing optical system into an image signal and for outputting said image signal;

detection means for repeatedly detecting a plurality of signal components which are different from each other from said image signal at a predetermined period and for sequentially outputting detecting information; and control means for controlling an operation state of said photographing optical system by detecting and processing said detection information.

32. An apparatus according to claim 31, wherein said detection means sequentially selects and outputs said plurality of signal components at a period synchronized with a vertical synchronous signal.

33. An apparatus according to claim 31, wherein said detection means includes a plurality of band pass filters which respectively have different pass bands and sequentially selects outputs of said plurality of band pass filters to repeatedly output the outputs thereof.

34. An apparatus according to claim 33, wherein said control means respectively compares said plurality of signal components currently output from said detection means with the plurality of signal components output from said detecting means in a preceding period and controls the operation state of said photographing optical system by using an output of a signal component which has a maximum change of level among said plurality of signal components.

35. An apparatus according to claim 34, wherein said control means adjusts focusing of said image pickup means on the basis of outputs of said plurality of band pass filters.

36. A measuring apparatus comprising:

sensor means for photoelectrically converting incident light into an electrical signal and for outputting said electrical signal;

detection means for repeatedly detecting a plurality of signal components which are different from each other from an output signal of said sensor means at a period synchronized with a vertical synchronous signal to sequentially output detection information;

storage means for storing said detection information output from said detection means;

comparison means for comparing a detection information output from said detection means with detection information stored in said storage means to detect a difference therebetween; and output means for outputting a signal representative of a photographing state according to said difference of detection information.

37. An apparatus according to claim 36, wherein said detection information comprises frequency components which respectively have different bands, and wherein said output means outputs a signal corresponding to an in-focus state by using a frequency component which has a maximum change among said frequency components.

* * * * *

UNITED STATES PATENT AND TRADEMARK OFFICE
CERTIFICATE OF CORRECTION

PATENT NO. : 4,980,773

DATED : December 25, 1990

INVENTOR(S) : Hirofumu Suda, et al.

It is certified that error appears in the above-identified patent and that said Letters Patent is hereby corrected as shown below:

COLUMN 1:

Line 65, "infocus" should read --in-focus--.

COLUMN 4:

Line 54, "time point, in time" should read --point in time,--.

COLUMN 5:

Line 39, "above" should read --above.--.

COLUMN 6:

Line 47, "the" should be deleted; and

Line 58, "has" should read --was--.

Signed and Sealed this

Twenty-fifth Day of August, 1992

Attest:

DOUGLAS B. COMER

*Attesting Officer*  *Acting Commissioner of Patents and Trademarks*